Jan. 31, 1950     H. C. FOSTER ET AL     2,495,925
PROCESS OF PRODUCING CARBON BLACK PRODUCTS
Filed Sept. 28, 1944     2 Sheets-Sheet 1
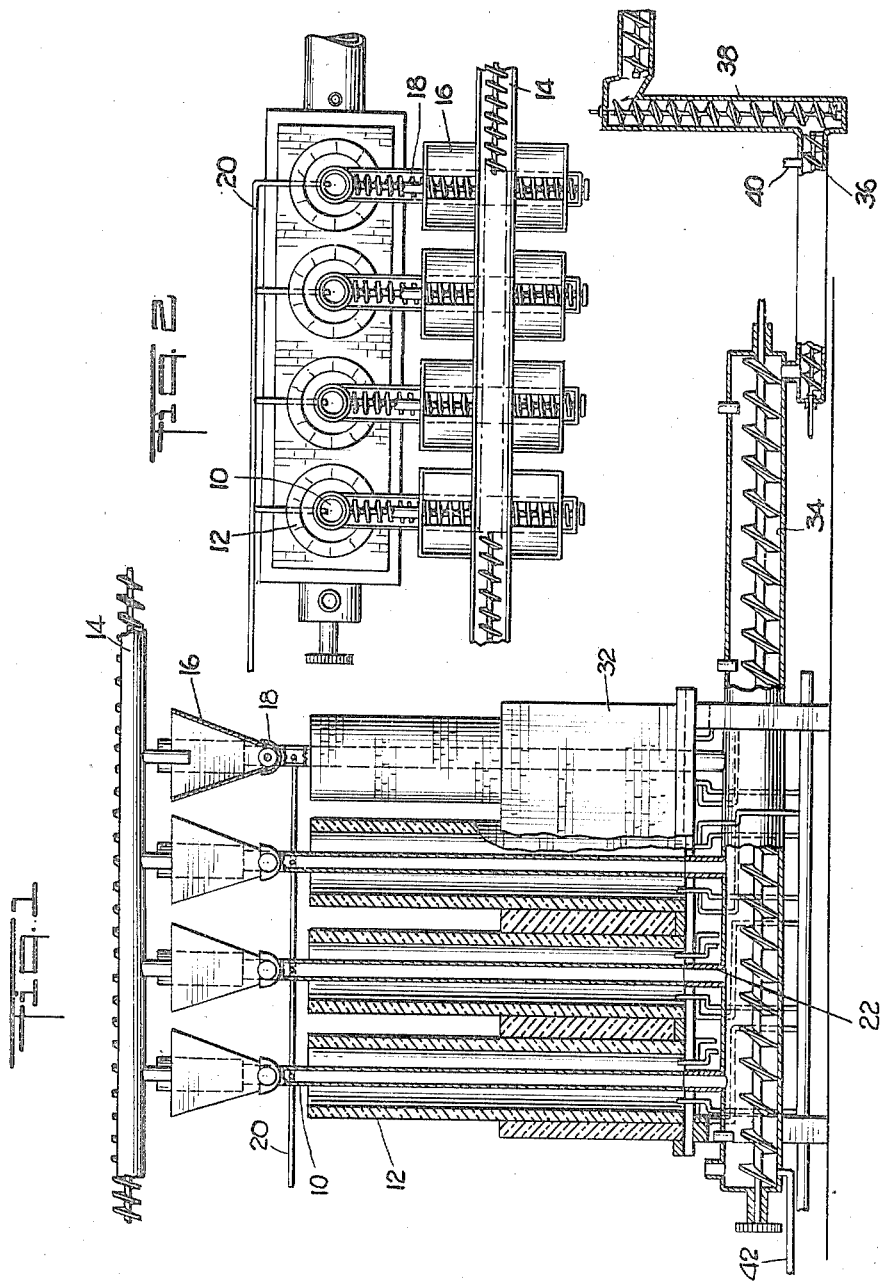
INVENTORS
HENRY C. FOSTER
BERNARD JOHNSON
BY
Pennie Davis Marvin & Edmonds
ATTORNEYS

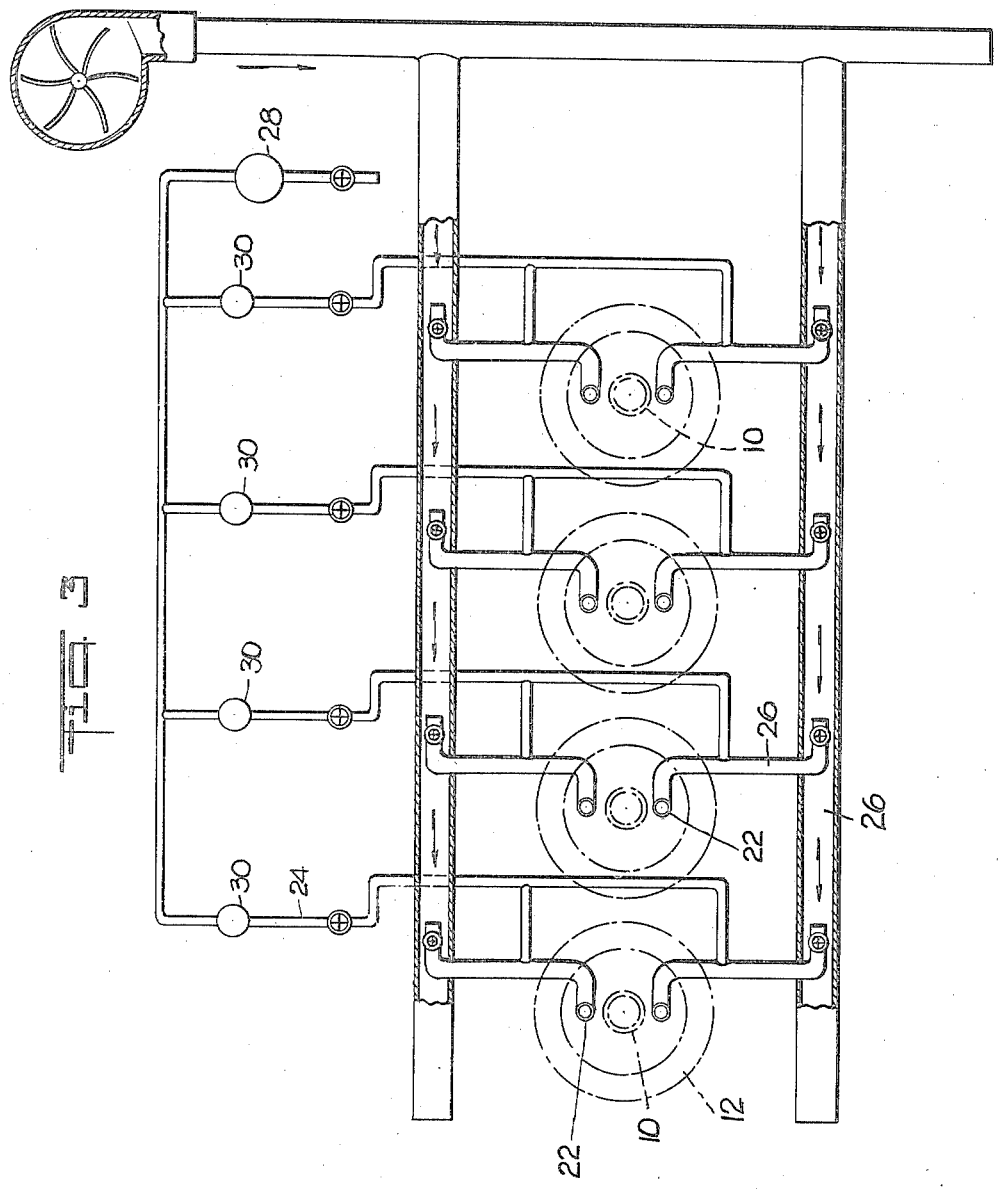

Patented Jan. 31, 1950

2,495,925

UNITED STATES PATENT OFFICE 2,495,925

PROCESS OF PRODUCING CARBON BLACK PRODUCTS

Henry C. Foster, Mount Lebanon, Pa., and Bernard Johnson, Lefors, Tex., assignors to Columbian Carbon Company, New York, N. Y., a corporation of Delaware Application September 28, 1944, Serial No. 556,196

4 Claims. (Cl. 23—209.9)

This application relates to improvements in carbon black. It includes a new form of carbon black, as well as a process by which it is advantageously produced and apparatus in which the process may be carried out and the new product produced.

The new product of the invention is one produced from any of the forms of impalpable black produced by the partial oxidation of natural gas, the most common being impingement (channel, roller, etc.) black and furnace black. Impingement black is produced by causing a flame of natural gas with insufficient oxygen or air for complete combustion to impinge upon a metal surface, with deposition thereon of the black which is removed by scraping. Furnace and related blacks are produced by the combustion of natural gas with insufficient oxygen or air for complete combustion in an open space, the black being collected from the combustion gases after cooling by appropriate filters, electrical precipitators or the like.

In either case, the black is obtained in the form of an impalpable powder. The blacks so produced contain volatile material in some cases in considerable amount, mainly oxides of carbon, and have, in some cases, relatively restricted capacities for absorbing liquids, and relatively low electrical conductivities, although these properties vary. Some blacks, e. g., fine impingement blacks, have much higher absorptions than others, e. g., ordinary rubber grade blacks, and the various blacks have different conductivities, ranging from fairly good to quite poor.

The new products of the invention are produced by subjecting the impalpable black so produced to a high temperature under conditions such that no shearing or compressive forces are applied to it and under non-oxidizing or reducing conditions. Advantageously, this is accomplished by causing the black to fall freely, i. e., while unsupported by an underlying mass of carbon black, through a highly heated vertical tube of relatively restricted cross-section, through which there may be passed an upwardly ascending stream of inert or reducing gas, such as natural gas, to slow up somewhat the rate of fall of the black, and to maintain non-oxidizing or reducing conditions. The black, in a highly heated condition, passes from the bottom of the tube into an insulated conveyor where it is maintained at a high temperature for a substantial period of time, for example, one to two hours or more, and is then cooled down to a temperature at which activation does not occur, e. g., 100° F., before exposure to the air.

The process materially modifies the properties of the black. It imparts to it what may be called "structure" hereafter defined as used herein. It increases substantially the capacity of the black to absorb liquids and increases substantially the electrical conductivity of the black. Normally, carbon black exists in the form of discrete masses of cohering particles which can be disassociated and dispersed by suitable procedures, such as high viscosity milling in rubber. In the new product of the invention, which has "structure," the particles of the masses are fused or sintered together to form networks or "brush heaps" of carbon chains, the individual particles of which are not disassociated or separately dispersed even with high viscosity milling. We believe, although we do not wish to be bound by any theory, that this structure imparts the high absorption to the new product, and is responsible, in part at least, for the high conductance of the new product. In this application, the term "structure" is used to denote this structural property of the new product, and to distinguish it from the normal products, having the structural properties previously referred to. This formation of structure in the black takes place during the initial heat treatment, when the black is passed through the highly heated vertical tubes without being subjected to shearing, compressive or other disruptive forces.

At the same time, during the passage through the highly heated vertical tube, the volatile matter in the black is driven off, so that the product at the bottom of the tube has low volatile content which may not exceed 0.1%, and may be even less. The volatile content is advantageously reduced below 0.5%. The low volatile content is maintained by not exposing the black to air or any activating gas until it has been cooled to a temperature below that at which activation, or the formation of oxides of carbon, or the absorption of volatile matter, takes place.

The extended soaking period, in which the black is kept at a relatively high temperature for a period of one or two hours, seems to bring about some change in the internal nature of the particles themselves, shown by a sharper and more defined X-ray diffraction pattern, indicating a development or an improvement in the crystallinity of the product.

The greatly increased electrical conductivity of the black produced may be attributable in part to the development of structure, which reduces resistance between particles, in part to the elimination of volatile content, which has a similar effect, and in part to the change in the nature of the particles themselves, the development of crystallinity, referred to above, which reduces the resistance within the particles, during the extended soaking at high temperatures, as the new form of black has a higher intrinsic conductivity than the original form.

The new blacks so produced have an adequate absorption and conductivity to be useful in dry cell batteries, a use for which carbon blacks as heretofore produced have not been available. Only Shawinigan black, produced by the thermal decomposition of acetylene, has been useful for this purpose.

The substantial differences in properties between the new products and the ordinary carbon blacks are shown by comparative tests. For example, one impingement carbon black tested had a volatile content of 12%, an electrical resistivity in ohms per centimeter cube, at a pressure of 150 pounds per square inch, of 31, and at a carbon volume fraction of 0.07, of 3,000, and an absorption, as determined by the amount of electrolyte solution (174 parts water, 126 parts zinc chloride, 112 parts ammonium chloride) required to make a given weight of black into a coherent ball, of 10. As compared with this, the same product subjected to the process of this invention, and converted to the new product of this invention, had a volatile content of less than 0.5%, in some cases 0.1 to 0.2% or even less, a resistivity at 150 pounds pressure per square inch of 0.35 and at a volume fraction of 0.07 of 2.3, and an absorption, determined as above, of 16.3 or higher, well within the range of products useful in the manufacture of dry cells.

In carrying out the invention, the carbon black is heated, under conditions in which it is not subjected to shearing, compressive or other disruptive forces to very high temperatures, for example, from 1800° F. to 3600° F., advantageously above 2500° F., for the period of time required to drop freely through a tube which may be about twelve feet high, advantageously against a slow stream of natural gas introduced at the bottom of the tube. The heating is mainly indirect, although partly direct, as the vertical tube is in a furnace which is highly heated by the combustion of natural gas or other suitable fuel which serves to heat the black and the combustion of the natural gas introduced at the bottom of the tube or the volatile matter carried by the carbon black, with the air entrained with the carbon black, serves to supply a relatively small amount of additional heat, mostly at or near the top of the tube. It should be noted that the carbon black, when introduced at the top of the tube, is in a loose, fluffy condition, such as is obtained when the very light product scraped off a depositing surface, in the case of impingement black, is subjected only to the normal action of conveyor screws from the plant hopper to the furnace used in treating the black. The less the apparent density of the black which is fed to the top of the tubes, the more effective appears to be the conversion in the tubes.

In the apparatus of the invention, the black drops directly from the heating tube to a relatively large insulated horizontal conveyor, which, because of the large volume of hot black it holds, serves to keep the black at a relatively high temperature for a substantial period of time. For example, a conveyor 20 inches in diameter may be used with four vertical 4-inch heating tubes. A conveyor 37 feet long, and of that diameter, will keep the black at an adequately high temperature for about one and a half hours, sufficient to accomplish the desired results. From this large conveyor, the black is fed to a small conveyor to a vertical screw of adequate height to provide a seal against the entry of air into the portions of the apparatus in which there is hot carbon black. The conveyor system insures that the black is cooled to a temperature at which activation does not occur, e. g., 100° F., before it is exposed to air. This conveyor may lead directly to a packer, or to a suitable storage vessel. Other means of maintaining the necessary high temperature for the extended period may, of course, be used.

The invention will be further described in connection with the appended drawings, but it is not limited thereto.

In the drawings—

Figure 1 is a view in elevation, partly in section, of a furnace which embodies the invention and is adapted for carrying out the process and producing the new product;

Figure 2 is a plan view of the furnace; and

Figure 3 is a diagrammatic sketch of the piping arrangement for the supply of heating gas and air.

The apparatus illustrated consists of four parallel 4-inch inside diameter tubes 10, which may be about 12 feet long, of a suitable refractory material such as sillimanite, each surrounded by a furnace wall 12 of firebrick or the like, and supported on metal collars 11. Carbon black, of either the impingement or furnace or other type is supplied by a conveyor 14 to the hoppers 16, each provided at the bottom with a screw conveyor 18 feeding one of the tubes. Black is fed at such a rate that there is a continuous stream falling through each tube but such that it does not collect as a body in the tubes. Thus, the condition of the black falling in the tubes is analogous to falling snow, and each discrete mass or unit simultaneously absorbs radiant heat from the hot tubes, and so rapidly that it is heated to a white heat substantially instantaneously, that is, in a matter of a few seconds. A gas line 20 is connected to the top of each tube, so that natural gas may be supplied to cut down the amount of air introduced with the black, and at the bottom of each tube is a similar gas connection (not shown) for the introduction of a small amount of natural gas, which serves to slow down the rate of fall of the black and to assist in maintaining non-oxidizing conditions within the tubes.

The tubes are heated by gas flames from the burners 22 which in turn are fed by the gas lines 24 and the air supply lines 26 as illustrated in Figure 3. Control of the gas supply is obtained through the master control 28, and individual controls 30 on the supply lines to each of the furnaces.

In the furnace illustrated, loss of heat is cut down by surrounding at least the lower parts of the firebrick furnaces by the brick structure 32.

Each of the tubes 10 feeds, through the collars 11, into the enlarged insulated conveyor tube 34, which, in the apparatus illustrated with four heating tubes, may be about 20 inches in diameter and 37 feet long, and with a 10-inch conveyor screw. This conveyor tube leads to a second, smaller, horizontal tube 36, which in turn feeds to a vertical conveyor tube or rotary lift 38, about 10 inches in diameter and 14 feet high, the column of black in the conveyor tube or rotary lift serving to prevent the entry of air into the conveyor tubes. In the large tube, the black is kept at a high temperature for about one to two hours, while in the small, horizontal tube and the vertical conveyor tube or rotary lift it becomes cooled down so that at the top of the lift its temperature is sufficiently low so that activation does not occur, usually around 100° F. The lift may feed directly to a packer or to a suitable storage vessel, but care must be taken that before the black is exposed to the air, its temperature is below that at which activation occurs, which may, in some cases, be as low as 100° F.

To insure the absence of oxidizing gases from the conveyor tubes, there are provided gas inlets 40 and 42 at the ends of the large conveyor tube through which a small amount of gas is fed to prevent the entry of any air. This gas flows through the conveyor tube and is carried out through the vertical tubes of the furnace.

Of course, the entire system is made as airtight as possible, but as noted, adequate provision is made for feeding natural gas or an inert gas to prevent any leakage of oxidizing gases into the system.

Successful results are obtained, with apparatus of the size described, with rates of feed of 20 lbs. of carbon per hour per tube, with the black being heated to 2600° F., with gas fed to the top of each tube slowly, at about the minimum rate required to assure a flame condition at all times, perhaps 5 to 10 cubic feet per hour per tube, to the bottom of each tube at a similar or even slower rate, and to the main conveyor, at inlet 42, at the rate of about 120 cubic feet per hour.

The term "carbon black" as used herein is intended to include those products commonly recognized as carbon black, produced from natural gas, that is, the impingement carbon blacks, and the various types of furnace carbon black, but not such products as acetylene or Shawinigan black and lamp black, which, unlike the carbon blacks, are not produced from natural gas. The materials which may be used for producing the new products of the invention, and to which the process is applicable, may have particle sizes ranging from 10 to 100 millimicrons.

We claim:

1. The process which comprises feeding finely-divided carbon black at such a rate and in such manner to a heating zone for free and clear fall therethrough that it passes through said zone in non-compacted, loose and fluffy condition by gravity flow, and heating said black in said zone substantially instantaneously to a temperature of at least 1800° F.

2. The process which comprises feeding finely-divided carbon black at such a rate and in such manner to a heating zone for free and clear fall therethrough that it passes through said zone in non-compacted, loose and fluffy condition by gravity flow, heating said black in said zone substantially instantaneously to a temperature between 2500° F. and 3600° F., and maintaining the carbon black at such temperature for a relatively short period of time.

3. The process which comprises feeding finely-divided carbon black at such a rate and in such manner to a heating zone for free and clear fall therethrough that it passes through said zone in non-compacted, loose and fluffy condition by gravity flow, and heating said black in said zone primarily by radiant heat and under non-oxidizing conditions substantially instantaneously to a temperature of at least 1800° F.

4. The process which comprises feeding finely-divided carbon black at such a rate and in such manner to a heating zone for free and clear fall therethrough that it passes through said zone in non-compacted, loose and fluffy condition by gravity flow, heating said black in said zone substantially instantaneously to a temperature of at least 1800° F., collecting the heated carbon black, maintaining it at a high temperature for a period of more than one hour, then cooling the carbon black to a temperature below that of activation before exposing it to oxidizing conditions, the carbon black being maintained in non-oxidizing conditions at all times while its temperature exceeds that at which activation starts.

HENRY C. FOSTER.
BERNARD JOHNSON.

REFERENCES CITED

The following references are of record in the file of this patent:

UNITED STATES PATENTS

| Number | Name | Date |
|---|---|---|
| 1,285,363 | Pike | Nov. 19, 1918 |
| 1,411,647 | Singmaster et al. | Apr. 4, 1922 |
| 1,789,380 | Edwards et al. | Jan. 20, 1931 |
| 1,807,884 | Wiegand | June 2, 1931 |
| 2,047,064 | Gillette | July 7, 1936 |
| 2,178,582 | Wiegand | Oct. 31, 1939 |
| 2,260,746 | Hanawalt et al. | Oct. 28, 1941 |
| 2,342,862 | Hemminger | Feb. 29, 1944 |
| 2,367,928 | Clark | Jan. 23, 1945 |

FOREIGN PATENTS

| Number | Country | Date |
|---|---|---|
| 118,922 | Austria | Sept. 5, 1944 |
| 456,252 | Great Britain | Nov. 5, 1936 |

OTHER REFERENCES

Johnson, Ind. & Eng. Chem., vol. 20, 1928, pp. 904 to 908.

Wiegand, Canadian Chem. & Process Ind., Mar. 1944, pp. 151–162.

Kaufmann, Canadian Chem. and Met., vol. 17, May 1933, pp. 93–95.